(12) United States Patent
Fukaya et al.

(10) Patent No.: US 7,088,504 B2
(45) Date of Patent: Aug. 8, 2006

(54) SURGICAL MICROSCOPE

(75) Inventors: Takashi Fukaya, Tama (JP); Tomonori Ishikawa, Hachioji (JP); Shunichiro Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 124 days.

(21) Appl. No.: 10/733,122

(22) Filed: Dec. 11, 2003

(65) Prior Publication Data

US 2004/0120031 A1    Jun. 24, 2004

Related U.S. Application Data

(63) Continuation of application No. PCT/JP02/111282, filed on Oct. 30, 2002.

(30) Foreign Application Priority Data

Oct. 10, 2002    (JP)    .............................. 2002-297915

(51) Int. Cl.
*G02B 21/22*    (2006.01)
*G02B 21/00*    (2006.01)

(52) U.S. Cl. ..................... 359/378; 359/368; 359/376
(58) Field of Classification Search ................ 359/363, 359/368, 374–380
See application file for complete search history.

(56) References Cited

U.S. PATENT DOCUMENTS

| 4,364,629 | A | * | 12/1982 | Lang et al. ................. 359/377 |
| 5,138,486 | A | * | 8/1992 | Meyer et al. ............... 359/363 |
| 5,331,457 | A | * | 7/1994 | Hanzawa et al. ........... 359/377 |
| 5,557,454 | A | * | 9/1996 | Takahashi .................... 359/378 |
| 5,729,382 | A |   | 3/1998 | Morita et al. ............... 359/368 |
| 6,327,079 | B1 | * | 12/2001 | Namii et al. ................ 359/376 |

FOREIGN PATENT DOCUMENTS

| JP | 56-144410 | | 11/1981 | |
| JP | 3-80849 | | 4/1991 | |
| JP | 4-355712 | * | 12/1992 | ................ 359/376 |
| JP | 2001-117015 | | 4/2001 | |

\* cited by examiner

*Primary Examiner*—Thong Q Nguyen
(74) *Attorney, Agent, or Firm*—Scully, Scott, Murphy & Presser, P.C.

(57) ABSTRACT

Binocular luminous fluxes are formed by an objective lens and a pair of relay lenses and go through a splitting optical system, which allows an assistant to observe the same stereoscopic view as the surgeon by using an assistant's binocular eyepiece optical system at a location across from the surgeon via a splitting optical system. Part of at least one of the binocular luminous fluxes is incident on a pupil splitting optical system, forming a binocular luminous flux that has undergone pupil splitting, which allows stereoscopic observation by pupil splitting even when the assistant's binocular eyepiece optical system is rotated to the surgeon's side.

14 Claims, 8 Drawing Sheets

SURGICAL MICROSCOPE

CROSS REFERENCE TO RELATED APPLICATION

This application is a continuation application of PCT/JP02/111282 filed on Oct. 30, 2002 the disclosure of which is incorporated herein by its reference.

TECHNICAL FIELD

The present invention relates to a surgical microscope with which observation is made possible by an assistant switching between a binocular light flux produced by a pair of relay lenses and a binocular light flux produced by a pupil splitting optical system.

BACKGROUND ART

Surgical microscopes that allow a plurality of physicians to observe an operation have come into use in recent years as surgical precision has been demanded. Also, as surgical procedures have become increasingly specialized, microscopes that are easier to use for each procedure have been provided. Such microscopes include the one discussed in Japanese Laid-Open Patent Application S56-144410, which is used mainly in neurosurgery or in ear, nose, and throat department, and the one discussed in Japanese Laid-Open Patent Application H3-80849, which is used mainly in orthopedic department and plastic surgery department.

Japanese Laid-Open Patent Application S56-144410 discloses a microscope comprising a formal observer's binocular microscope, which a surgeon (the formal observer) uses for observation, and a sub-observer's binocular microscope, which is freely-detachably attached to the side of the formal observer's binocular microscope and is used by an assistant (the sub-observer) for observation.

Japanese Laid-Open Patent Application H3-80849 discloses a microscope comprising an objective lens barrel made up of an objective lens and a variable-magnification optical system; an opposed lens barrel including a beam splitter that splits the luminous flux from the objective lens barrel into two directions; and two eyepiece lens barrels attached to the ends of the opposed lens barrel.

DISCLOSURE OF INVENTION

The surgical microscope comprises:

an objective optical system, including an objective lens that converges the luminous flux from a subject and a pair of relay lenses disposed facing the objective lens, and producing first binocular luminous fluxes on the basis of the luminous flux incident on the objective lens;

a pupil splitting optical system, disposed at a pupil location substantially conjugate to the entrance pupil of the objective optical system, for splitting at least one of the first binocular luminous fluxes at the pupil location and thereby producing second binocular luminous fluxes;

a binocular eyepiece optical system, producing an optical image for binocular observation on the basis of the first binocular luminous flux or the second binocular luminous flux; and a housing, in which the objective optical system and the pupil splitting optical system are disposed such that the first binocular luminous fluxes and the second binocular luminous fluxes are located on substantially the same circumference, at the location where the first binocular luminous fluxes and the second binocular luminous fluxes are incident on the binocular eyepiece optical system, with the direction of travel of the first binocular luminous fluxes and the second binocular luminous fluxes parallel to the optical axis of the objective lens.

BRIEF DESCRIPTION OF THE DRAWINGS

FIGS. 1 to 3 pertain to a first embodiment of the present invention.

FIGS. 4 to 7 pertain to a second embodiment of the present invention.

FIGS. 8 to 10 pertain to a third embodiment of the present invention.

FIGS. 11 to 13 relate to a fourth embodiment of the present invention, with FIG. 11 being a side view of the surgical microscope in the fourth embodiment of the present invention;

BEST MODE FOR CARRYING OUT THE INVENTION

Embodiments of the present invention will be described in reference to drawings as follows.

First Embodiment

The first embodiment of the present invention will be described in reference to FIGS. 1 to 3.

First, the constitution of this embodiment will be described.

Figure 1:
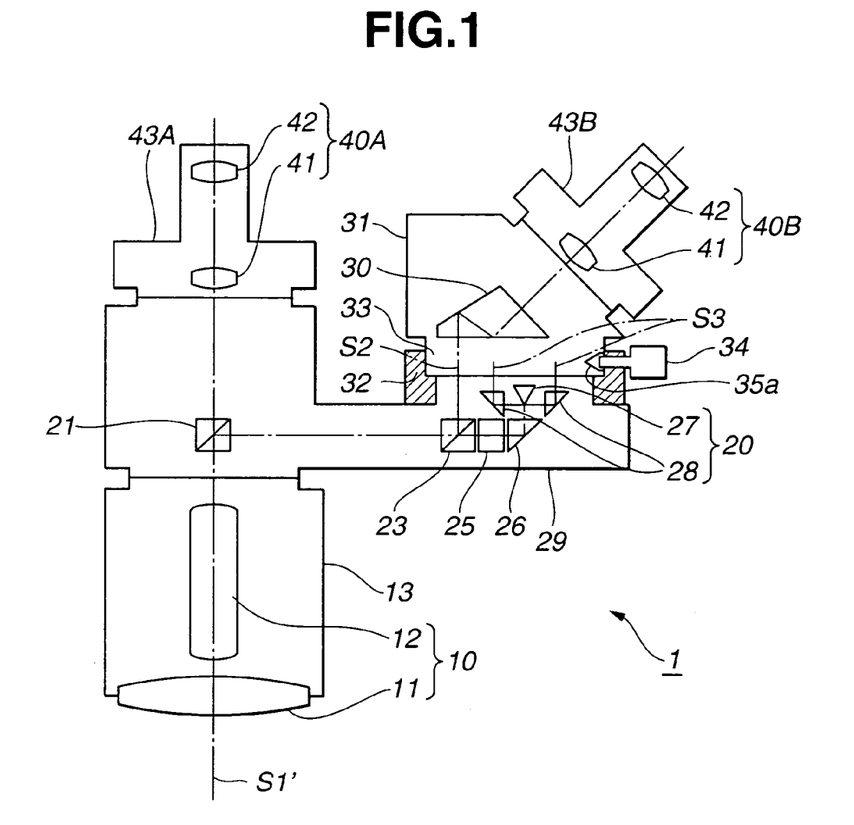
FIG. 1 is a side view of the surgical microscope in the first embodiment of the present invention.

With a surgical microscope 1 shown in FIG. 1, an objective optical system 10 which consists of an objective lens 11 with a large diameter that converges the luminous flux coming from the surgery site and a pair of relay lenses 12 disposed across from this objective lens 11, a pupil splitting optical system 20 that splits the luminous flux at a pupil location conjugate with the entrance pupil of the objective optical system 10, and an assistant's binocular eyepiece optical system 40B are disposed in that order.

The relay lenses 12, which are disposed facing the objective lens 11 and separated from each other in the direction corresponding to the left and right direction of the surgeon, form a pair, one of which lies in the plane of FIG. 1, and the other of which is disposed parallel to this plane and a specific distance away in the perpendicular direction. These lenses constitute a variable-magnification optical system or the like. The objective lens 11 and the pair of relay lenses 12 constitute the objective optical system 10, and are housed in an objective housing 13.

Figure 2:
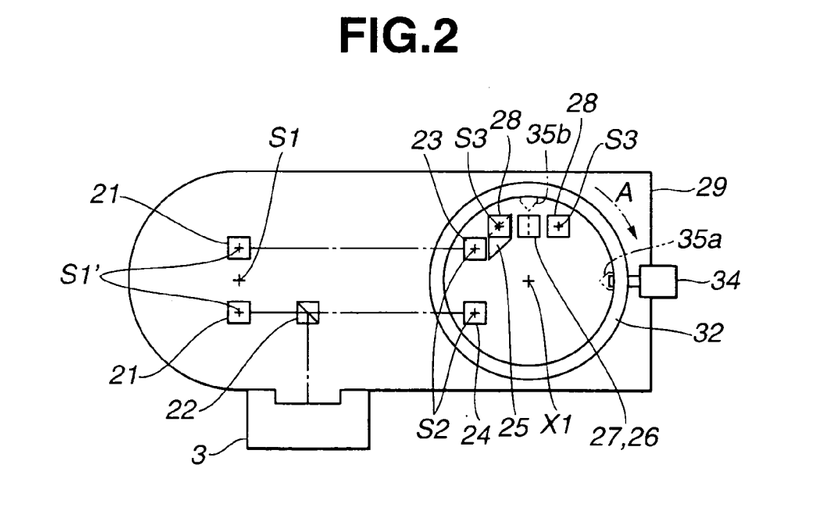
FIG. 2 is a top view showing the disposition of the optical system on the first intermediate lens barrel housing side in a state in which the second intermediate lens barrel housing and so forth have been removed in the surgical microscope in FIG. 1.

In FIGS. 1 and 2, a pair of first half-prisms 21 that forms a splitting optical system is disposed on the exit side of the pair of relay lenses 12. The pair of first half-prisms 21 split the incident binocular luminous flux into a transmitted luminous flux side and a reflected luminous flux side.

A surgeon's binocular eyepiece optical system 40A is disposed on the transmitted luminous flux side of the pair of first half-prisms 21.

A second half-prism 22 is disposed on the optical path on one of the two luminous fluxes reflected by the pair of first half-prisms 21, and a third half-prism 23 is disposed on the optical path of the other luminous flux.

In FIG. 2, a first triangular prism 24 is disposed on the side of the luminous flux transmitted by the second half-prism-22, and this transmitted luminous flux is reflected upward, perpendicular to the plane of the drawing.

A parallel prism 25 is disposed on the side of the luminous flux transmitted by the third half-prism 23, and this transmitted luminous flux is guided to a second triangular prism 26 disposed to the rear thereof. That is, the second triangular prism 26 is disposed to the rear of the parallel prism 25, and reflects all light and guides it to a luminous flux splitting prism 27 side disposed on the reflected optical path.

The apex distal end of this luminous flux splitting prism 27 is disposed at a pupil location conjugate to the entrance pupil of the objective optical system 10, and the luminous flux incident at this pupil location is split.

The pair of third triangular prisms 28 is located on one side of the luminous flux splitting prism 27 where the luminous fluxes are split, and the other pair of third triangular prisms 28 is located on the other side thereof.

The pair of first half-prisms 21, the second half-prism 22, the third half-prism 23, the first triangular prism 24, the parallel prism 25, the second triangular prism 26, the luminous flux splitting prism 27, and the pair of third triangular prisms 28 are housed in a first intermediate lens barrel housing 29.

The luminous flux splitting prism 27 and the pair of third triangular prisms 28 make up the pupil splitting optical system 20.

A 45° reflecting prism 30 is designed to direct the incident luminous flux at an angle of 45°. This 45° reflecting prism 30 is located on the reflected luminous flux side of the first half-prisms 21 in the first intermediate lens barrel housing 29, and is housed in a second intermediate lens barrel housing 31 having a male attachment member 33 rotatably linked to a female attachment member 32 having a circular opening in the direction perpendicular to this reflected luminous flux.

An eyepiece lens barrel housing 43B is attached to an opening on the exiting luminous flux side in the second intermediate lens barrel housing 31, and inside this eyepiece lens barrel housing 43B are disposed a pair of image-forming lenses 41 and a pair of eyepiece lenses 42 that face the pair of luminous fluxes exiting from the 45° reflecting prism 30. This constitutes the assistant's binocular eyepiece optical system 40B.

An eyepiece lens barrel housing 43A is also attached to the opening provided on the transmitted luminous flux side of the first half-prisms 21 in the first intermediate lens barrel housing 29, and inside this eyepiece lens barrel housing 43A are disposed the pair of image-forming lenses 41 and the pair of eyepiece lenses 42. This constitutes the surgeon's binocular eyepiece optical system 40A.

Thus, there are two binocular eyepiece optical systems provided, the surgeon's binocular eyepiece optical system 40A disposed on the transmitted luminous flux side of the first half-prisms 21, and the assistant's binocular eyepiece optical system 40B disposed on the reflected luminous flux side.

With this surgical microscope 1, the pair of relay lenses 12 (spaced apart to the left and right to fit the spacing of the left and right eyes of the surgeon) produce a binocular luminous flux with respect to the optical axis S1 of the objective lens 11. S1' indicates the optical axis of the binocular luminous flux parallel to the optical axis S1 produced by the pair of relay lenses 12.

In this embodiment, the optical axis S2 of the luminous fluxes reflected by the third half-prism 23 and the first triangular prism 24, which are a binocular luminous flux produced by the pair of relay lenses 12, and the optical axis S3 of the binocular luminous flux produced by the pupil splitting optical system 20 (more specifically, the binocular luminous flux reflected by the pair of third triangular prisms 28) are parallel to the optical axis S1 of the luminous flux of the objective lens 11.

The binocular luminous flux reflected by the third half-prism-23 and the first triangular prism 24, and the binocular luminous flux reflected by the pair of third triangular prisms 28 pass locations equidistant from the center X1.

More specifically, as shown in FIG. 2, two optical axes S2 and two optical axes S3 are in a relationship such that they lie on the same circumference whose center is a center X1 of the female attachment member 32 with a circular opening, that is, they perfectly match up (overlap) when rotated 90 degrees.

Therefore, an assistant or the like can observe from the side of the surgeon in the state shown in FIG. 3 by rotating and fixing the attachment location of the second intermediate lens barrel housing 31 with respect to the first intermediate lens barrel housing 29 by 90 degrees from the state in FIG. 1, as will be discussed below. In the state in FIG. 1, the surgeon and the assistant are across from one another while performing stereoscopic observation, and when the second intermediate lens barrel housing 31 side in FIG. 1 is rotated by 90 degrees, the state then becomes one in which the assistant observes from the side of the surgeon.

Thus, with this embodiment, the optical system is designed so that the optical axis S2 of the reflected luminous flux produced by the third half-prism 23 and the first triangular prism 24, and the optical axis S3 of the binocular luminous flux produced by the pupil splitting optical system 20 are parallel to the optical axis S1 of the objective lens 11, and when the optical axes S2 and S3 are viewed in the axial direction passing through the center X1 parallel to the optical axis S1, the optical axes S2 and S3 of the first and second binocular luminous fluxes lie on the same circumference.

In this embodiment, as discussed above, it is preferable that there is provided an optical system disposed such that the optical axes S2 and S3 fall on the same circumference, but within the allowable range of the optical system resulting from a combination of the binocular eyepiece optical system 40B and the 45° reflection prism 30, S2 and S3 do not have to fall completely on the same circumference as long as observation is possible. In other words, a certain amount of design or assembly error is included in this embodiment.

The various housings will now be described.

The objective housing 13, the first intermediate lens barrel housing 29, the second intermediate lens barrel housing 31, and the two eyepiece lens barrel housings 43A and 43B are all designed to be freely removable.

Also, the first intermediate lens barrel housing 29 and the second intermediate lens barrel housing 31 have the female circular attachment member 32 and the male circular attachment member 33 that fits therein. For example, when a fixing pin 34 threaded into the female circular attachment member 32 is pressed against a first recess 35a formed in the male circular attachment member 33, the second intermediate lens barrel housing 31 is positioned and fixed with respect to the first intermediate lens barrel housing 29.

The center of the circle of the two circular attachment members 32 and 33 here coincide with the center X1 of the circumference of the circle on which the optical axes S2 and S3 are formed.

Also, a second recess 35b (see FIG. 2) is formed in the male circular attachment member 33 at an angle of 90 degrees with respect to the center X1 as the center. This allows the second intermediate lens barrel housing 31 to be fixed also in the orientation shown in FIG. 3.

The second recess 35b indicated by the two-dotted chain line in FIG. 2 is provided to the male circular attachment member 33. FIG. 2 also depicts the first recess 35a with a two-dotted chain line. More specifically, stereoscopic observation from the surgeon's side can be accomplished by rotating the second intermediate lens barrel housing 31 side 90 degrees clockwise (the direction indicated by the two-dotted chain line arrow A in FIG. 2) and positioning and fixing it to the first intermediate lens barrel housing 29.

The operation in this embodiment will now be described.

In FIG. 1, the luminous flux coming from the subject facing the objective lens 11, or more specifically, from the surgeon's side, is converged by the objective lens 11 and made into a binocular luminous flux by the pair of relay lenses 12 disposed apart from each other in the left and right direction of the surgeon's observation, and this binocular luminous flux is incident on the pair of first half-prisms 21.

The luminous fluxes that are transmitted by the pair of first half-prisms 21 go through the pair of surgeon's image-forming lenses 41, forming left and right images, and these left and right images are stereoscopically observed by the surgeon through the pair of eyepiece lenses 42.

Meanwhile, of the two luminous fluxes reflected by the first half-prisms 21, the lower one in FIG. 2 is incident on the second half-prism 22, and the luminous flux reflected here is incident on a camera optical system 3 to be used for photographing the image.

The luminous flux that is transmitted by the second half-prism 22 is incident on the first triangular prism 24 and reflected to a right angle direction, then is incident on the 45° reflecting prism 30 shown in FIG. 1, which is disposed in the path of this reflection, and after the light is reflected twice, it exits at a 45° angle to its incidence direction and becomes one of the binocular luminous fluxes.

Of the two luminous fluxes reflected by the first half-prisms 21, the upper one in FIG. 2 is incident on the third half-prism 23, and the luminous flux reflected here similarly goes through the 45° reflecting prism 30 and becomes the other of the binocular luminous fluxes.

The binocular luminous flux thus created passes through the pair of image-forming lenses 41 to produce left and right images, and these left and right images can be observed by an assistant surgeon through the eyepiece lenses 42 from the direction facing the surgeon, with the same three-dimensional effect as that seen by the surgeon.

In FIGS. 1 and 2, the luminous flux transmitted by the third half-prism 23 goes through the parallel prism 25 and the second triangular prism 26 and is incident on the luminous flux splitting prism 27. Since the luminous flux splitting prism 27 here is disposed at a pupil location conjugate to the entrance pupil of the objective optical system 10, the luminous flux reflected here becomes a so-called pupil split binocular luminous flux, passing through the pair of third triangular prisms 28, 28 and being incident on the second intermediate lens barrel housing 31.

Here, when the assistant wishes to observe from the surgeon's side, the fixing pin 34 is loosened, the male circular attachment member 33 of the second intermediate lens barrel housing 31 is temporarily removed from the female circular attachment member 32 of the first intermediate lens barrel housing 29, and then the orientation of the second intermediate lens barrel housing 31 is changed by 90 degrees so that the fixing pin 34 will mate the second recess 35b formed at a 90-degree angle with respect to the first recess 35a, and the fixing pin 34 is pushed into the second recess 35b and positioned and fixed therein.

Figure 3:
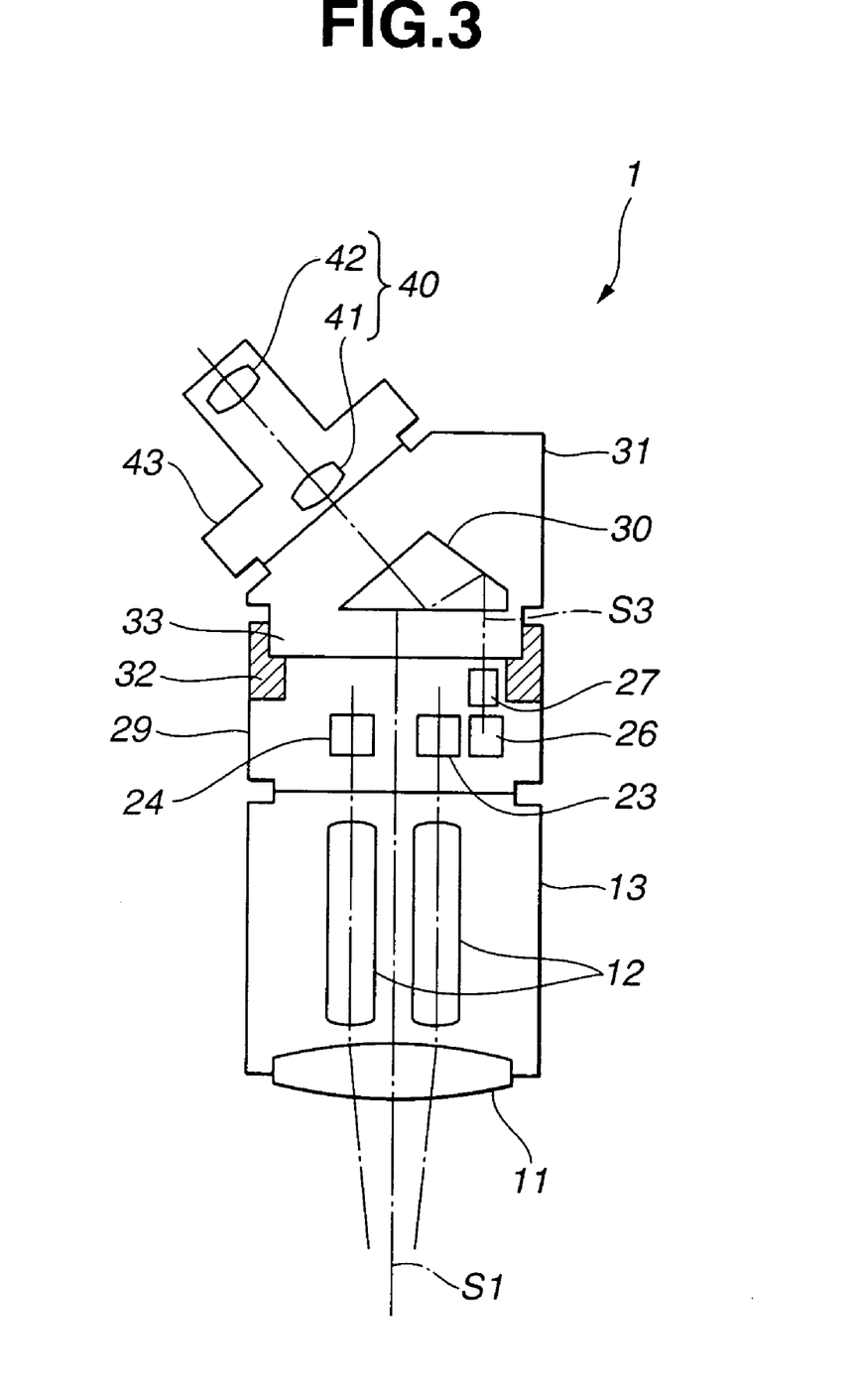
FIG. 3 is a rear view in a state in which the second intermediate lens barrel housing side of the surgical microscope in FIG. 1 has been rotated 90°.

This results in the state shown in FIG. 3, in which the pupil split binocular luminous flux from the pair of third triangular prisms 28, 28 is imaged through the 45° reflecting prism 30 and the image-forming lenses 41, then observed by the assistant through the eyepiece lenses 42. The above procedure allows the assistant to observe a stereoscopic image from the side of the surgeon, although the image is a weaker stereoscopic image produced by splitting one of the binocular luminous fluxes viewed by the surgeon.

This embodiment has the following effects.

As described above, with this embodiment the assistant can observe the same three-dimensional view as that seen by the surgeon, from the direction in which the direction of the assistant's binocular eyepiece optical system 40B with respect to the objective optical system 10 is opposite the surgeon's binocular eyepiece optical system 40A, and even when the observation direction is changed from this state to a state of observation from the side, a weak three-dimensional image can still be observed through a pupil splitting optical system.

Therefore, the assistant can set the binocular eyepiece optical system 40B to the direction opposite the surgeon and observe the surgery with the same three-dimensional view as that seen by the surgeon, which means that the microscope can be used in orthopedic or plastic surgery.

Further, since the assistant can observe the surgery by setting the binocular eyepiece optical system 40B to the side of the surgeon, the microscope can also be used in neurosurgery and otorhinological operations. Therefore, the surgical microscope of this embodiment can be shared by a number of departments.

Also, a surgical microscope that allows the common use and sharing of an objective lens, variable-magnification optical system, and binocular lens barrel among departments can be obtained by adding the second intermediate lens barrel housing 31, which houses a first binocular luminous flux produced by the pair of relay lenses 12 and the first intermediate lens barrel housing 29 that contains the pupil splitting optical system 20, and the second binocular luminous flux produced by the pupil splitting optical system 20, as in this embodiment, to the product of combining an objective housing that contains an objective optical system with an eyepiece lens barrel housing that contains a binocular eyepiece optical system, as with existing surgical microscopes.

In addition, even once a dedicated surgical microscope has been purchased, the function that allows the position of the assistant to be changed can be added at a later date, which reduces the financial burden on the purchaser.

It is also possible to replace the objective housing 13 and perform stereoscopic observation using an objective optical system of a different magnification, or to replace the eyepiece lens barrel housings 43A and 43B for stereoscopic observation.

The parallel prism 25 shown in FIG. 2 is designed such that when the luminous flux reflected by one of the half-prisms 21 is incident, this incident luminous flux is reflected in a parallel direction and guided to the second triangular prism 26, but if the light is instead guided in a direction that is not parallel, it will be possible to observe from a direction (orientation) that is shifted slightly from an exact 90° angle from the surgeon's side.

Also, with this embodiment the luminous flux on the third half-prism 23 side is subjected to pupil splitting, and if an optical system is also provided for the pupil splitting of the luminous flux on the first triangular prism 24 side, the assistant will be able to observe the surgery from the other side, which is opposed to the one side shown in FIG. 3. In this case a half-prism is used instead of the first triangular prism 24.

Second Embodiment

The second embodiment of the present invention will be described through reference to FIGS. 4 to 7.

First, the constitution of this embodiment will be described.

Figure 4:
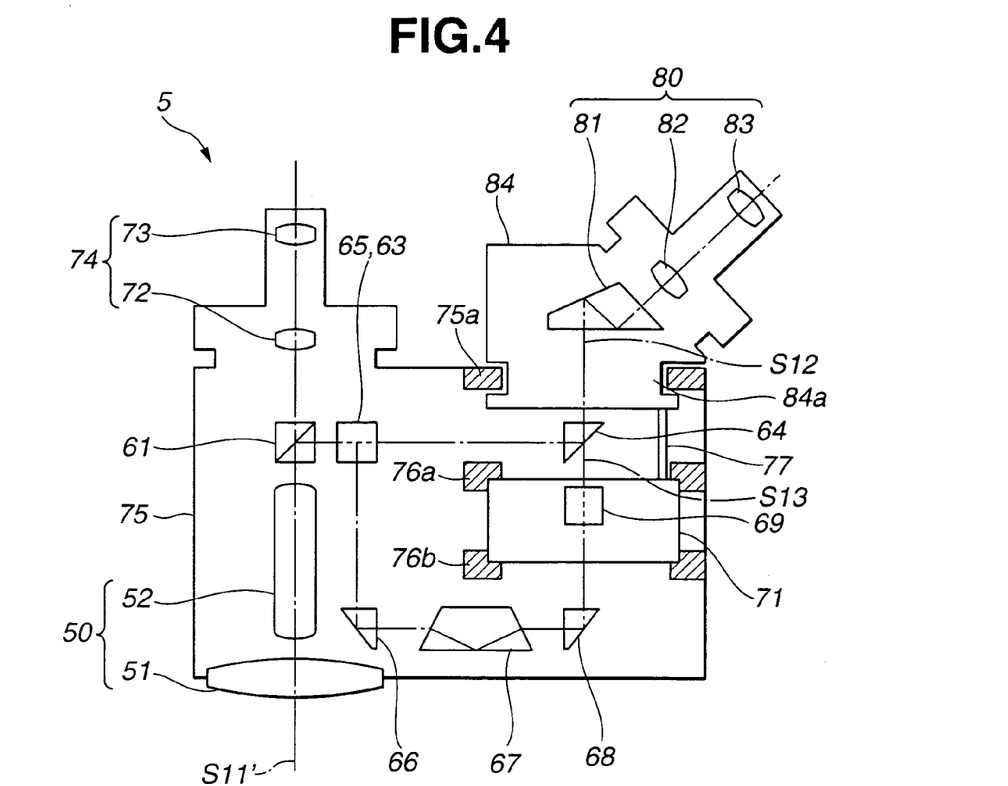
FIG. 4 is a side view of the surgical microscope in the second embodiment of the present invention.
Figure 5:
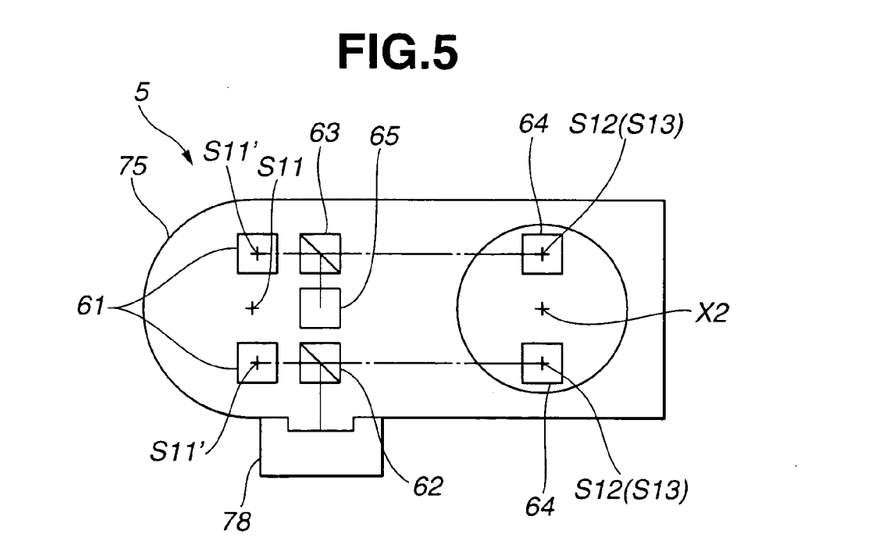
FIG. 5 is a top view showing the disposition of the optical system on the outer housing side in a state in which the rotary housing has been removed in the surgical microscope in FIG. 4.
Figure 6:
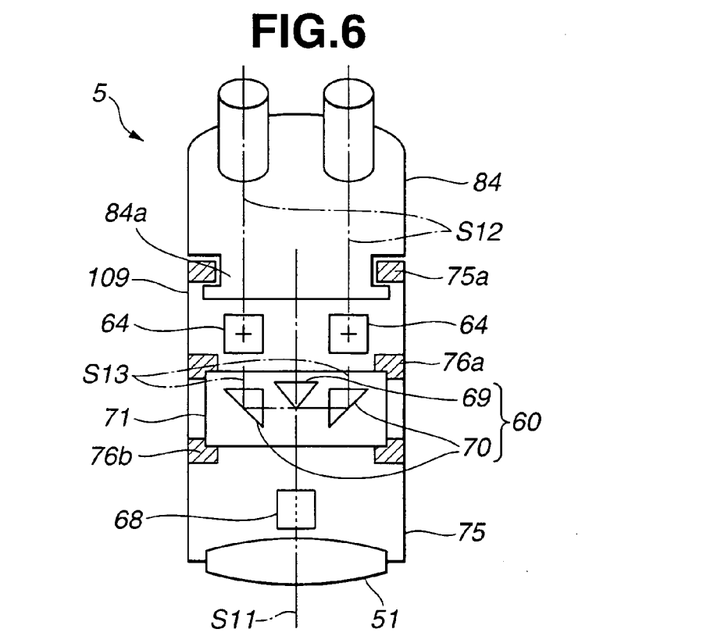
FIG. 6 is a rear view of the surgical microscope in FIG. 4.

In FIGS. 4, 5, and 6, the surgical microscope 5 of this embodiment comprises an objective optical system 50, which consists of an objective lens 51 and a pair of relay lenses 52, a pupil splitting optical system 60 that is disposed at a pupil location conjugate with the entrance pupil of the objective optical system 50 and splits the luminous flux at the pupil location, and a binocular eyepiece optical system 80 disposed on the side of the luminous flux exiting the pupil splitting optical system 60 and on the side of the reflected light of the binocular luminous flux produced by the pair of relay lenses 52.

The objective lens 51, which has a large aperture, is attached to the opening at the lower end of an outer housing 75, and the pair of relay lenses 52 is disposed facing this objective lens 51 and separated in a specific direction (the left and right direction of the surgeon).

The relay lenses 52 are constituted by a variable-magnification optical system or the like disposed in a pair in the direction perpendicular to the drawing plane in FIG. 4.

A pair of first half-prisms 61 are disposed respectively on the exit side of the pair of relay lenses 52. A second half-prism 62 and a third half-prism 63 are disposed respectively on the optical path of the luminous fluxes reflected by the pair of first half-prisms 61.

A pair of first triangular prisms 64, 64 are disposed respectively on the optical paths of the luminous fluxes transmitted by the second half-prism 62 and third half-prism 63, reflect the light upward, and guide the light to the binocular eyepiece optical system 80 inside a rotary housing 84 rotatably supported by the outer housing 75.

In other words, an opening that is substantially circular is provided at the upper end of this outer housing 75, and a substantially circular frame 84a at the lower end of the rotary housing 84 is rotatably supported and kept from slipping off by a frame holder 75a around the edge of this opening.

The binocular eyepiece optical system 80 inside this rotary housing 84 consists of a 45° reflecting prism 81, a pair of second image-forming lenses 82, and a pair of second eyepiece lenses 83.

As shown in FIG. 4, when the rotary housing 84 is set to an orientation opposite a surgeon's binocular optical system 74, the binocular luminous flux reflected by the pair of first triangular prisms 64, 64 is incident on the 45° reflecting prism 81, and after being reflected twice by this 45° reflecting prism 81, each luminous flux is formed into an image by the pair of second image-forming lenses 82, and the resulting images are stereoscopically observed by an assistant through the pair of second eyepiece lenses 83.

As shown in FIG. 5, a second triangular prism 65 is disposed between the second half-prism 62 and the third half-prism 63, and the luminous flux reflected by the third half-prism 63 is incident thereon. As shown in FIG. 4, this second triangular prism 65 reflects downward the luminous flux reflected by the third half-prism 63, so that the light is incident on a third triangular prism 66.

To describe the situation by referencing to FIG. 5, the luminous flux reflected by the third half-prism 63 is reflected downward and perpendicular to the drawing plane by the second triangular prism 65.

The luminous flux reflected by the second triangular prism 65 is reflected to the right in FIG. 4 by the third triangular prism 66, and then guided to an image rotation prism 67, which functions to rotate an image.

The image rotation prism 67 is disposed on the optical path of the luminous flux reflected by the third triangular prism 66, and the luminous flux exiting this image rotation prism 67 is incident on a fourth triangular prism 68. This fourth triangular prism 68 reflects the incident luminous flux upward in FIG. 4, and the light is incident on a luminous flux splitting prism 69, which constitutes the pupil splitting optical system.

This luminous flux splitting prism 69 is disposed at a pupil location conjugate to the entrance pupil of the objective optical system 50, and as shown in FIG. 6, splits the luminous flux entering from the fourth triangular prism 68, and guides it to the pair of fifth triangular prisms 70 disposed on both sides thereof.

In other words, the pair of fifth triangular prisms 70 is disposed on one side and other pair is located on the other side thereof, where the luminous flux is split by the luminous flux splitting prism 69, and reflects the split luminous fluxes and guides them upward.

The luminous flux splitting prism 69 and the pair of fifth triangular prisms 70 constitute the pupil splitting optical system 60, and this pupil splitting optical system 60 is housed inside a cylindrical middle housing 71 rotatably supported within the outer housing 75. The apex of the luminous flux splitting prism 69 is disposed on the center axis of the cylinder of the middle housing 71.

Meanwhile, as shown in FIG. 4, the binocular eyepiece optical system 74 consists of a pair of first image-forming lenses 72 and a pair of first eyepiece lenses 73 disposed on the transmitted luminous flux side of the pair of first half-prisms 61, allowing the surgeon to perform stereoscopic observation from the binocular eyepiece optical system 74.

The above-mentioned optical system ranged from the objective lens 51 to the first eyepiece lenses 73 is housed in the outer housing 75, and the middle housing 71 is freely rotatable with respect to the outer housing 75. For example, the edges at the upper and lower ends of the cylindrical middle housing 71 are freely rotatably supported by being fitted into frame holders 76a and 76b provided on the inside the outer housing 75.

Also, the center axis of the cylindrical shape of this middle housing 71 is the freely revolvable (rotatable) center axis X2 thereof, and this center axis X2 coincides with the rotational center axis of the rotary housing 84.

In other words, the middle housing 71 and the rotary housing 84 share the rotational center axis X2, and the middle housing 71 and the rotary housing 84 are linked by a linking member 77 so as to rotate integrally and maintain the position where the pupil splitting binocular luminous flux from the pupil splitting optical system 60 is incident on the binocular eyepiece optical system 80, including the 45° reflecting prism 81.

The optical axis S12 of the luminous fluxes reflected by the first triangular prisms 64, which are a binocular luminous flux produced by the pair of relay lenses 52, and the optical axis S13 of the luminous fluxes reflected by the fifth triangular prisms 70, which are a binocular luminous flux produced by the pupil splitting optical system 60, are parallel to the optical axis S11 of the objective lens 51. The optical axis S11 of the objective lens 51 is parallel to each optical axis S11' of the binocular luminous flux produced by the pair of relay lenses 52.

The optical axes S12 and S13 lie on the same circumference whose center is the center axis X2. As mentioned above, the middle housing 71 and the rotary housing 84 rotate integrally, or at least in conjunction, having the center axis X2 of the middle housing 71 as their rotational-center.

The pair of first triangular prisms 64, which direct the binocular luminous flux produced by the pair of relay lenses 52 so as to be parallel to the binocular luminous flux exiting the pupil splitting optical system 60, are disposed between the middle housing 71 containing the pupil splitting optical system 60, and the rotary housing 84 containing the binocular eyepiece optical system 80 on which the binocular luminous flux from this pupil splitting optical system 60 is incident.

The operation in this embodiment will now be described.

In FIG. 4, the luminous flux from the surgery site goes through the objective lens 51 and the relay lenses 52 and becomes a binocular luminous flux, which is then incident on the pair of first half-prisms 61. The binocular luminous flux transmitted by the pair of first half-prisms 61 results in left and right images being formed through the pair of first image-forming lenses 72. The left and right images are stereoscopically observed by the surgeon through the pair of first eyepiece lenses 73.

The two luminous fluxes reflected by the first half-prisms 61 are incident on the second half-prism 62 and the third half-prism 63, respectively. The luminous flux reflected by the second half-prism 62 is incident on a camera optical system 78. The luminous flux transmitted by the second-half-prism 62 and the third half-prism 63 is formed into an image through the pair of first triangular prisms 64, the 45° reflecting prism 81, and the pair of second image-forming lenses 82, and is then stereoscopically observed by the assistant through the pair of second eyepiece lenses 83. This allows the assistant to observe the same three-dimensional view as the surgeon while being positioned across from the surgeon.

In FIGS. 4 and 6, the luminous flux reflected by the third half-prism 63 goes through the second triangular prism 65 and the third triangular prism 66 and is incident on the image rotation prism 67.

Here, if the assistant wishes to observe from the side of the surgeon, as discussed below, the image rotation prism 67 is fixed to the outer housing 75 at a specific angle so that the observation image can be provided at the proper orientation. The luminous flux exiting the image rotation prism 67 goes through the fourth triangular prism 68 and is incident on the luminous flux splitting prism 69.

Since the luminous flux splitting prism 69 is disposed at a location conjugate to the entrance pupil of the objective optical system 50, the luminous flux reflected here becomes a so-called pupil split binocular luminous flux, passing through the pair of fifth triangular prisms 70 and being directed toward the rotary housing 84, but in the state in FIGS. 4 and 6, this light is blocked by the first triangular prisms 64 and is therefore not incident on the binocular eyepiece optical system 80.

Figure 7:
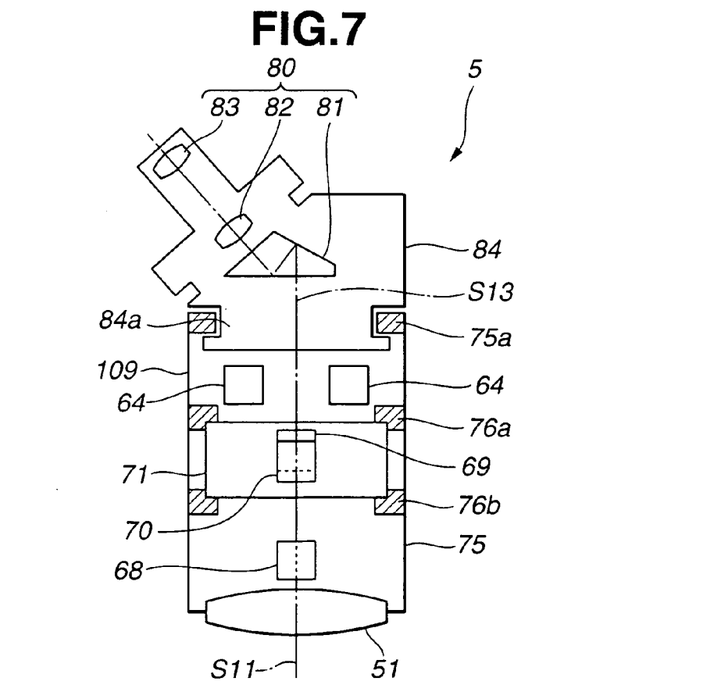
FIG. 7 is a rear view of a state in which the rotary housing side has been rotated approximately 90° from the state in FIG. 6.

When the assistant wishes to observe from the side of the surgeon, the rotary housing 84 is rotated 90 degrees, for example, to change from the state in FIG. 6 to that in FIG. 7. This causes the middle housing 71 also to rotate integrally, so the pupil split binocular luminous flux that has passed through the fifth triangular prisms 70 is no longer blocked by the first triangular prisms 64, and in FIG. 7 the pupil split binocular luminous flux that has passed through the pair of fifth triangular prisms 70 goes through the 45° reflecting prism 81 and the pair of second image-forming lenses 82, pupil splitting results in the formation of a pair of images, and these are stereoscopically observed by the assistant through the pair of second eyepiece lenses 83. Furthermore, this stereoscopic observation with the pupil split binocular luminous flux is the result of splitting one of the luminous fluxes that make up the surgeon's binocular luminous flux, and the image that is observed is a weaker three-dimensional image. In this manner, the assistant is able to view a three-dimensional image (although the image is less three-dimensional) of the surgery from the side of the surgeon.

Also, in FIG. 7, the orientation of the rotary housing 84 is set such that the assistant can look through the binocular eyepiece optical system 80 from the side at an angle of 90 degrees with respect to the surgeon, but observation is possible at other angles as well, as long as the above-mentioned pupil split binocular luminous flux is not blocked by the first triangular prisms 64. In other words, the pupil splitting binocular optical system allows the assistant to view a three-dimensional image (although the image is less three-dimensional) of the surgery from any direction, as long as the pupil split binocular luminous flux is not blocked by the first triangular prisms 64.

This embodiment has the following effects.

As described above, with this embodiment, the assistant's observation position can be changed without having to remove the rotary housing 84 in which the assistant's binocular eyepiece optical system 80 is housed, so the assistant's position can be easily changed so that the microscope can be used without problem by various departments during surgery. This also makes possible a surgical microscope that can be used in various departments because the same objective lens, variable-magnification optical system, and binocular lens barrel can be used.

Furthermore, the pupil splitting optical system 60 and the binocular eyepiece optical system 80 on which the binocular luminous flux produced by the pupil splitting is incident rotate integrally around the same rotational center axis X2, so the assistant can observe from a side direction other than 90 degrees. In other words, the pupil splitting binocular optical system allows the assistant to view a three-dimensional image (although the image is less three-dimensional) of the surgery from any direction except directly across from the surgeon, which allows for stereoscopic observation with a more comfortable posture.

Furthermore, the pair of first triangular prisms 64, which direct the binocular luminous flux produced by the relay lenses 52 so as to be parallel to the binocular luminous flux exiting the pupil splitting optical system 60, are disposed between the pupil splitting optical system 60 and the binocular eyepiece optical system 80, so when the assistant observes from a direction directly across from the surgeon, the same three-dimensional view as that seen by the surgeon can be obtained automatically, and this function is accomplished with an extremely simple structure. Therefore, with the surgical microscope of this embodiment, the assistant can observe the surgery with a good three-dimensional effect at a position directly across from the surgeon.

Third Embodiment

The third embodiment of the present invention will now be described by referencing to FIGS. 8 to 10.

First, the constitution of this embodiment will be described.

Figure 8:
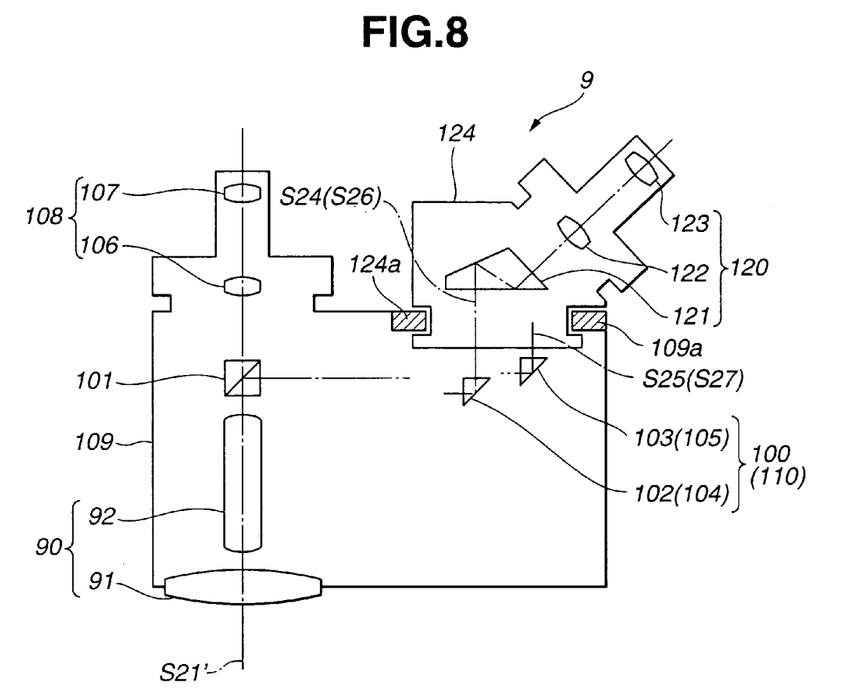
FIG. 8 is a side view of the surgical microscope in the third embodiment of the present invention.

As shown in FIG. 8, with a surgical microscope 9, an objective optical system 90 consisting of an objective lens 91 and a pair of relay lenses 92, pupil splitting optical systems 100 and 110 that split a luminous flux at a pupil location substantially conjugate to the entrance pupil of the objective optical system 90, and an assistant's binocular eyepiece optical system 120 are disposed in that order.

The relay lenses 92 are constituted by a variable-magnification optical system or the like disposed in a pair in the direction perpendicular to the drawing plane.

Figure 9:
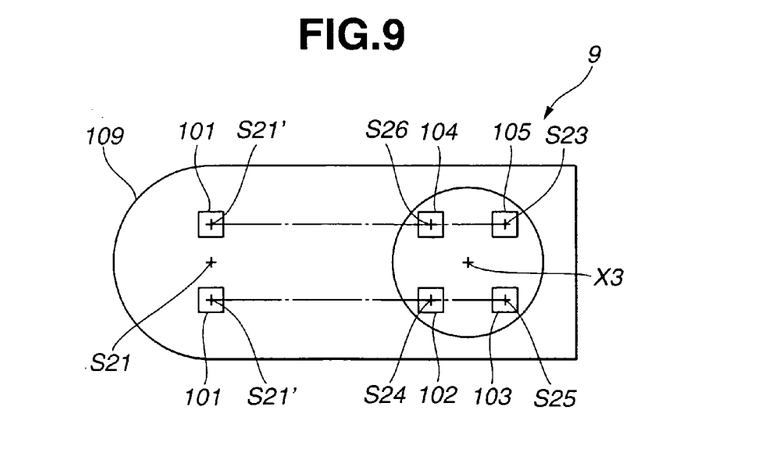
FIG. 9 is a top view of the surgical microscope in FIG. 8.

In FIGS. 8 and 9, a pair of first half-prisms 101 are disposed on the exit side of the pair of relay lenses 92, and guide light to the transmitted luminous flux side and the reflected luminous flux side.

A first triangular prism 102 and a second triangular prism 103 are disposed on the one optical path of the luminous fluxes reflected by the first half-prisms 101 so as to be apart from each other in the direction of travel of the reflected luminous flux and shifted in the direction parallel to the optical axis S21 of the objective lens 91.

The first triangular prism 102 and second triangular prism 103 are disposed near a pupil location substantially conjugate to the entrance pupil of the objective optical system 90, and are disposed such that the luminous fluxes of the relay lens 92 will be split in half before being incident, and therefore the first triangular prism 102 and second triangular prism 103 constitute a pupil splitting optical system 100.

Similarly, a third triangular prism 104 and a fourth triangular prism 105 are disposed on the optical path of the luminous flux reflected by the other first half-prism 101 and near a pupil location conjugate to the entrance pupil of the objective optical system 90, so as to be apart from each other in the direction of travel of the reflected luminous flux and shifted in the direction parallel to the optical axis S21 of the objective lens 91.

In other words, the third triangular prism 104 and fourth triangular prism 105 constitute the pupil splitting optical system 110.

The luminous fluxes transmitted by the pair of first half-prisms 101 are incident first on a pair of first image-forming lenses 106 and then on a pair of first eyepiece lenses 107, and the pair of first image-forming lenses 106 and the pair of first eyepiece lenses 107 constitute a binocular eyepiece optical system 108 through which the surgeon observes.

Everything described here from the objective lens 91 to the first eyepiece lenses 107 is housed in a lens barrel housing 109.

A circular opening is provided on the top side of this lens barrel housing 109 facing the first triangular prism 102 and second triangular prism 103, and also facing the third triangular prism 104 and fourth triangular prism 105 that constitute the pupil splitting optical systems 100 and 110, respectively, and a circular frame 124a of a rotary housing 124 in which the assistant's binocular eyepiece optical system 120 is housed is freely rotatably supported and kept from slipping off by a circular frame holder 109a around the edge of this opening.

This binocular eyepiece optical system 120 consists of a 45° reflecting prism 121, a pair of second image-forming lenses 122, and a pair of second eyepiece lenses 123.

In this embodiment, the optical axis S24 of the luminous flux reflected by the first triangular prism 102, the optical axis S25 of the luminous flux reflected by the second triangular prism 103, the optical axis S26 of the luminous flux reflected by the third triangular prism 104, and the optical axis S27 of the luminous flux reflected by the fourth triangular prism 105, which are binocular luminous fluxes produced by the pair of relay lenses 92, are parallel to the optical axis S21 of the luminous flux of the objective lens 91.

The optical axes S24 to S27 are set to lie on the same circumference whose center is the center X3 of the above-mentioned circular opening, and this center X3 lies on the rotational center axis of the rotary housing 124. The optical axes S21' of the pair of relay lenses 92 are parallel to the optical axis S21 of the objective lens 91.

The operation in this embodiment will now be described.

In FIG. 8, the luminous flux from the surgery site goes through the objective lens 91 and the pair of relay lenses 92 and becomes a binocular luminous flux, which is then incident on the pair of first half-prisms 101. The luminous fluxes transmitted by the first half-prisms 101 results in left and right images being formed through the pair of first image-forming lenses 106. The left and right images are stereoscopically observed by the surgeon through the first eyepiece lenses 107.

Meanwhile, each part of the two luminous fluxes reflected by the pair of first half-prisms 101 is reflected by the first triangular prism 102 and the third triangular prism 104 and incident on the binocular eyepiece optical system 120, and left and right images are formed through the 45° reflecting prism 121 and the pair of second image-forming lenses 122. This allows the assistant to perform stereoscopic observation through the pair of second eyepiece lenses 123.

With the luminous flux reflected by the first triangular prism 102 and the luminous flux reflected by the third triangular prism 104, part of each luminous flux from the relay lenses 92 is lost, but since this is the same binocular luminous flux as that seen by the surgeon, the assistant can observe with the same three-dimensional view as that of the surgeon from a location across the surgeon.

The luminous flux not reflected by the first triangular prism 102 and the third triangular prism 104 is reflected by the second triangular prism 103 and the fourth triangular prism 105 in the direction of the binocular eyepiece optical system 120. However, this light is not incident on the pair of second image-forming lenses 122 side.

In this case, since the third triangular prism 104 and the fourth triangular prism 105 constitute the pupil splitting optical system 110, the luminous flux reflected by each prism becomes a pupil split binocular luminous flux. Similarly, the luminous flux reflected by the first triangular prism 102 and the second triangular prism 103 also becomes a pupil split binocular luminous flux.

Figure 10:
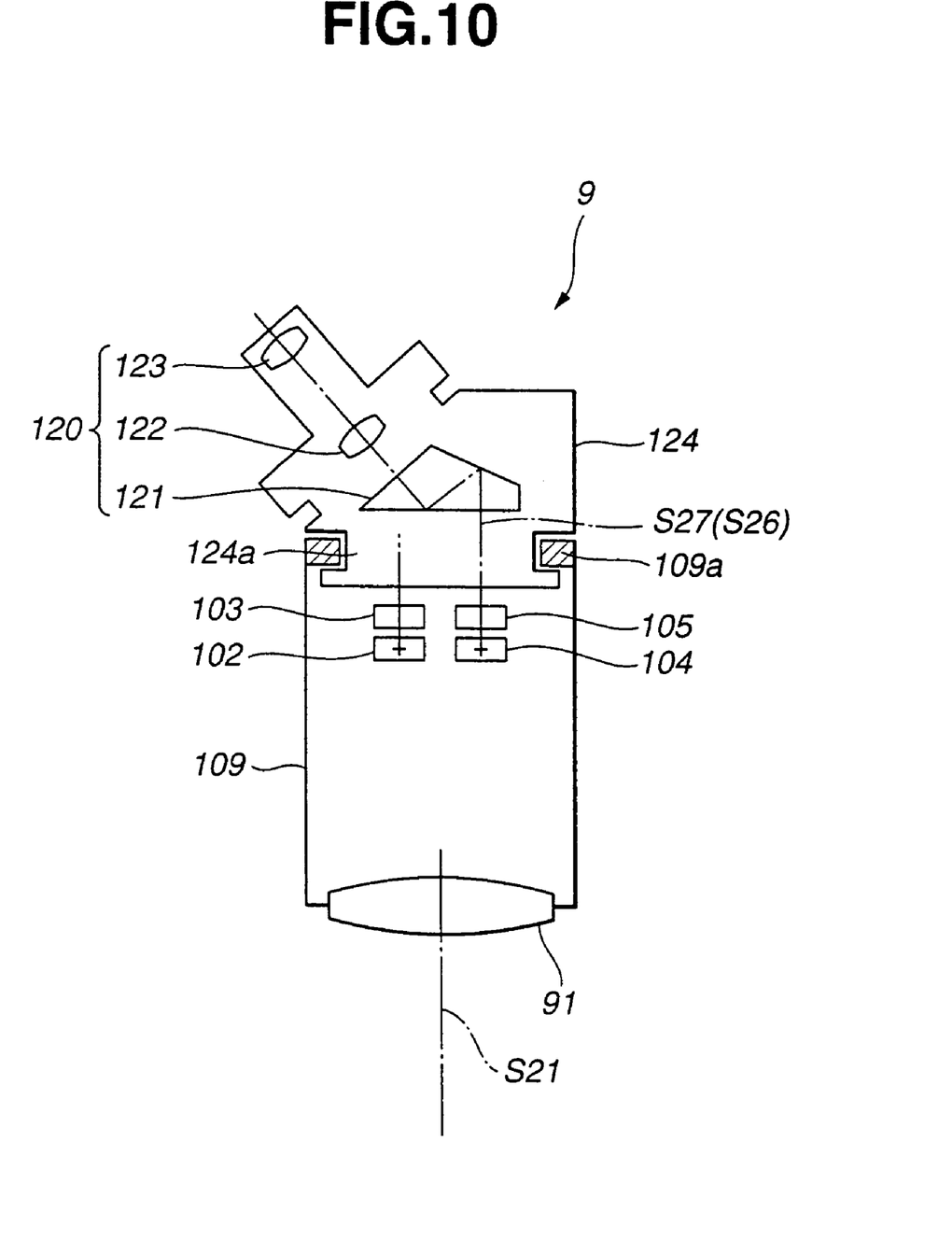
FIG. 10 is a rear view in a state in which the rotary housing side of the surgical microscope in FIG. 8 has been rotated 90°.

If, in this state, the assistant wishes to observe from the side of the surgeon, then the rotary housing 124 is rotated 90 degrees to the state in FIG. 10. As a result, the pupil split binocular luminous flux reflected by the third triangular prism 104 and the fourth triangular prism 105 goes through the 45° reflecting prism 121, is incident on the pair of second image-forming lenses 122, and forms a pair of images. This pair of images is stereoscopically observed by the assistant through the pair of second eyepiece lenses 123.

The stereoscopic observation afforded by this pupil split binocular luminous flux is the result of splitting one of the binocular luminous fluxes viewed by the surgeon, and the observed image is less three-dimensional. The above procedure allows the assistant to observe a stereoscopic image from the side of the surgeon, although it is a weaker stereoscopic image.

Also, the assistant can observe from the other side by rotating the rotary housing 124 180 degrees to the opposite side from that shown in FIG. 10.

This embodiment has the following effects.

As described above, this embodiment makes use of the binocular luminous flux produced by the pair of relay lenses 92 and the pupil split binocular luminous flux produced by the pupil splitting optical systems 100 and 110. The result of this constitution is that in this embodiment, with an extremely simple structure, a three-dimensional image (although the image is less three-dimensional) of the surgery can be observed from the side of the surgeon, and a three-dimensional image of the surgery can also be observed from directly across from the surgeon. It is also possible to obtain a surgical microscope that can be used in various departments because the same objective lens, variable-magnification optical system, and binocular lens barrel can be used.

Fourth Embodiment

Figure 12:
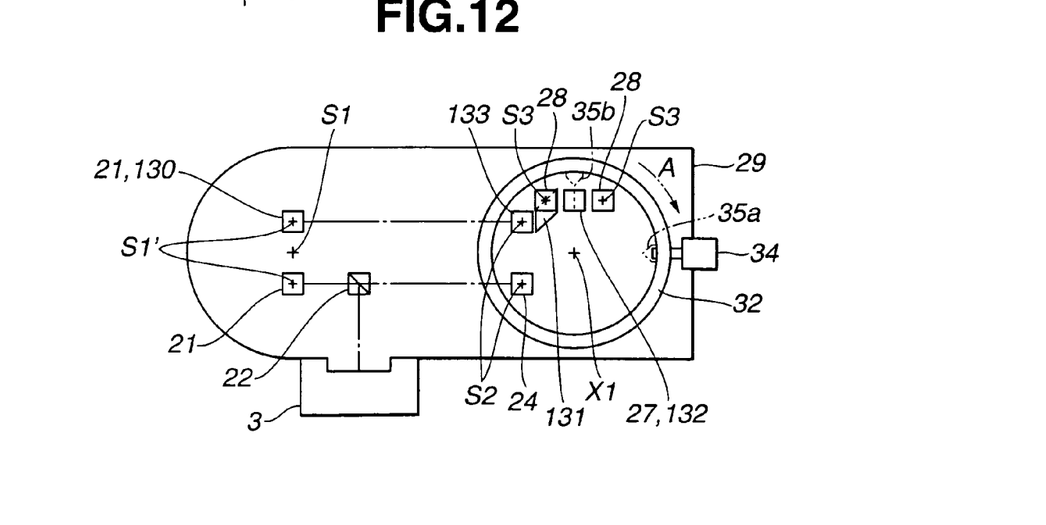
FIG. 12 is a top view of the layout of the optical system on the first intermediate lens barrel housing side, in a state in which the second intermediate lens barrel housing, etc., have been removed in the surgical microscope in FIG. 11.
Figure 13:
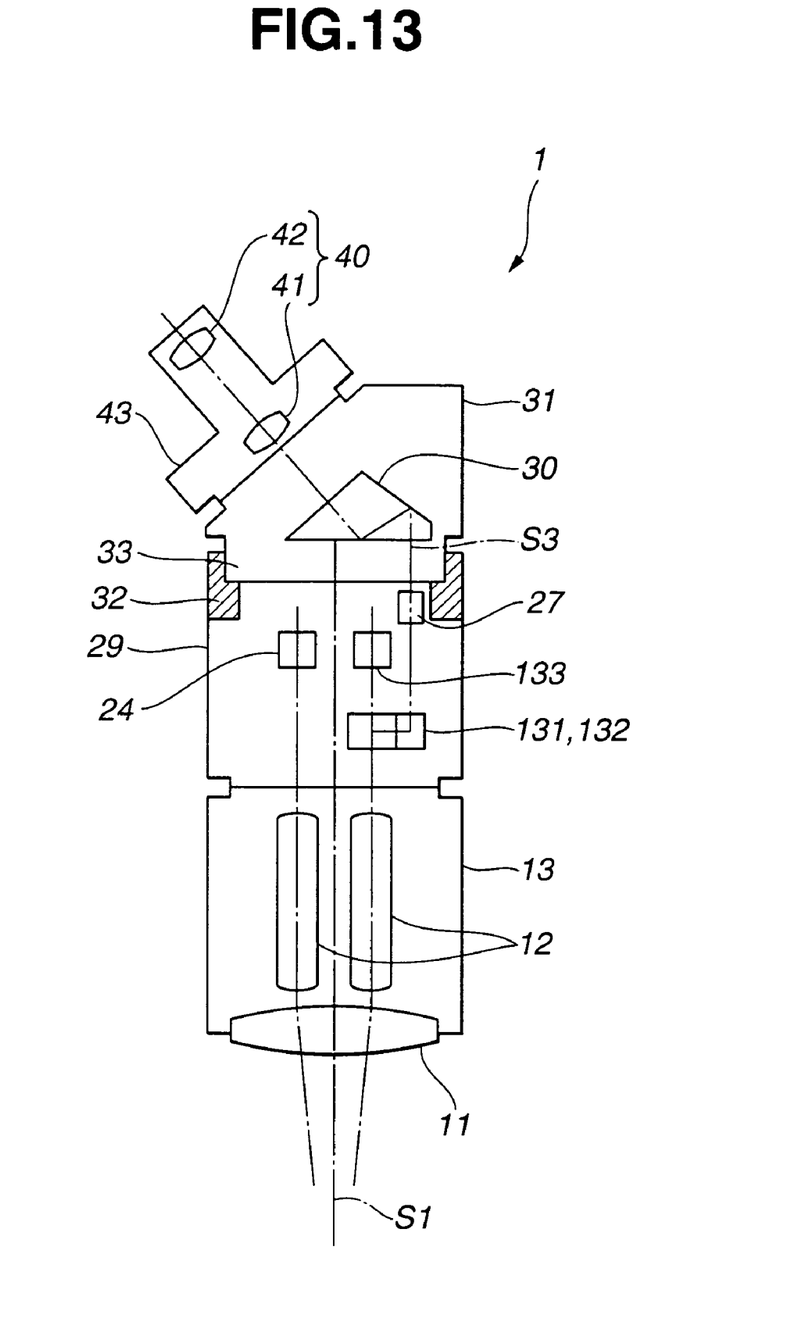
FIG. 13 is a rear view of the surgical microscope in FIG. 11 in a state in which the second intermediate lens barrel housing side has been rotated 90° and fixed.

The fourth embodiment of the present invention will now be described by referencing to FIGS. 11 to 13. This embodiment is a modification of the first embodiment given above, and the structure that is the same in FIGS. 1 to 3 is numbered in the same way and will not be described in detail again here.

Figure 11:
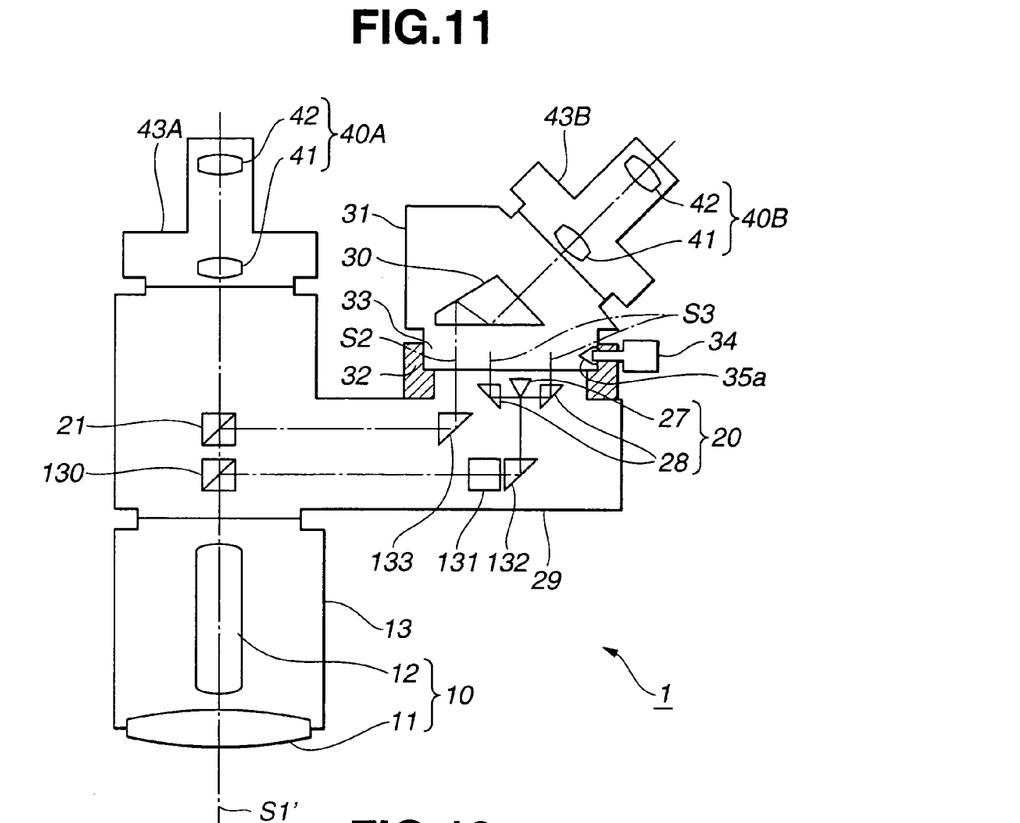

As shown in FIG. 11, with the surgical microscope 1, a fourth half-prism 130 is disposed on the optical path of one of the two luminous fluxes emitted from the pair of relay lenses 12. A structure the same as that in the first embodiment given above is disposed on the optical path of the other of the two luminous fluxes emitted from the pair of relay lenses 12, and the action thereof is the same, and so will not be described again in detail here.

This fourth half-prism 130 splits the incident luminous flux into a transmitted luminous flux side and a reflected luminous flux side. On the transmitted luminous flux side, the luminous flux that has passed through this fourth half-prism 130 is incident on the first half-prism 21 disposed on that optical path. This first half-prism 21 is a pair of half-prisms as described above in the first embodiment, and the luminous flux that has passed through the fourth half-prism 130 is incident on one of this pair of first half-prisms 21. This first half-prism 21 also splits the incident light into a transmitted luminous flux side and a reflected luminous flux side. One half of the surgeon's binocular eyepiece optical system 40A is disposed on the transmitted luminous flux side of this first half-prism 21, and the luminous flux that has passed through the first half-prism 21 is incident on the binocular eyepiece optical system 40A.

On the reflected luminous flux side of the first half-prism 21, the luminous flux that has been reflected by this first half-prism 21 is reflected by a total reflection prism 133 disposed on the optical path of this reflected luminous flux. In the microscope observation state shown in FIG. 11, the luminous flux reflected by this total reflection prism 133 is emitted through a 45° reflecting prism 30 disposed on the optical path of this reflected luminous flux. The luminous flux emitted from this 45° reflecting prism 30 is incident on the assistant's binocular eyepiece optical system 40B.

Next, the structure disposed on the optical path of the reflected luminous flux side of the fourth half-prism 130 will be described. On the reflected luminous flux side of this fourth half-prism 130, a parallel prism 131 is disposed on the optical path of the luminous flux reflected by this fourth half-prism 130. This parallel prism 131 guides the incident luminous flux to a total reflection prism 132 disposed to the rear thereof. The luminous flux reflected by this total reflection prism 132 is guided to a luminous flux splitting prism 27 disposed on the optical path along which this luminous flux is reflected. The structure and action of everything beyond this luminous flux splitting prism 27 are the same as in the first embodiment given above and will therefore not be described again.

The pair of first half-prisms 21, the second half-prism 22, the fourth half-prism 130, the first triangular prism 24, the parallel prism 131, the total reflection prism 132, the total reflection prism 133, the luminous flux splitting prism 27, and the pair of third triangular prisms 28 are housed in the first intermediate lens barrel housing 29.

This embodiment yields an effect equivalent to that of the first embodiment on the basis of its structure and action as described above.

INDUSTRIAL APPLICABILITY

As described above, the surgical microscope according to the present invention can change the assistant's observation position and can be applied to various departments such as neurosurgery, orthopedic, and the like.

The invention claimed is:

1. A surgical microscope, comprising:
a first housing, having an opening;
an objective optical system comprising an objective lens provided in the first housing, and a pair of relay lenses that are provided in the first housing and form first binocular luminous fluxes on the basis of a luminous flux incident through the objective lens;
a first binocular eyepiece optical system, provided in the first housing, and forming a first binocular optical image through the incidence of the first binocular luminous fluxes;
a splitting optical system, provided in the first housing, for splitting the first binocular luminous fluxes formed by the pair of relay lenses and thereby forming a plurality of split luminous fluxes including second binocular luminous fluxes that can exit at least through the opening;

a pupil splitting optical system, provided in the first housing, disposed at a pupil location substantially conjugate to the entrance pupil of the objective optical system, for splitting at least one of the plurality of split luminous fluxes so as to split the luminous flux at the pupil location, and thereby forming third binocular luminous fluxes and enabling the third binocular luminous fluxes to exit through the opening;

a second housing, attached to the opening, and capable of being set to at least first and second rotational angles with respect to an axis parallel to the travel direction of the second binocular luminous fluxes exiting through the opening; and a second binocular eyepiece optical system, provided in the second housing, forming a second binocular optical image on the basis of the second binocular luminous fluxes through the incidence of the second binocular luminous fluxes when the second housing is set to the first rotational angle, and forming a second binocular optical image on the basis of the third binocular luminous fluxes through the incidence of the third binocular luminous fluxes when the second housing is set to the second rotational angle.

2. The surgical microscope according to claim 1, wherein the splitting optical system forms a first splitting optical system that transmits and guides light to the first binocular eyepiece optical system, and a second splitting optical system that reflects and guides light to the pupil splitting optical system, through the incidence of the first binocular luminous fluxes.

3. The surgical microscope according to claim 1, wherein the first housing has an objective housing that supports the objective optical system, an intermediate lens barrel housing that supports the splitting optical system and the pupil splitting optical system, and an eyepiece lens barrel housing that supports the first eyepiece optical system.

4. The surgical microscope according to claim 3, wherein the intermediate lens barrel housing has the opening.

5. The surgical microscope according to claim 1, wherein, in a state in which the second housing is set to the first rotational angle, the second binocular eyepiece optical system is oriented facing the first binocular eyepiece optical system, in which state the second binocular luminous fluxes that is equivalent to the first binocular luminous fluxes are guided through the opening to the second binocular eyepiece optical system, and in a state in which the second housing is set to the second rotational angle, the second binocular eyepiece optical system is oriented to the side of the first binocular eyepiece optical system, in which state the third binocular luminous fluxes are guided through the opening to the second binocular eyepiece optical system.

6. The surgical microscope according to claim 1, wherein the second housing is attached to the first housing freely rotatably around its center axis that is parallel to the direction of travel of the second binocular luminous fluxes exiting the opening.

7. The surgical microscope according to claim 6, further comprising:

a third housing that supports the pupil splitting optical system and is disposed in the first housing so as to be rotatable around the same axis as the rotational axis of the second housing; and a linking member that links the second housing and the third housing, transmits the rotational force of the second housing to the third housing, and rotates the third housing in conjunction with the rotation of the second housing.

8. The surgical microscope according to claim 1, wherein the second housing is attached removably to the opening of the first housing.

9. The surgical microscope according to claim 1, wherein positioning means for positioning the second housing at the first rotational angle and the second rotational angle is provided.

10. The surgical microscope according to claim 1, wherein the pupil splitting optical system splits each luminous flux of the second binocular luminous fluxes to form two pairs of third binocular luminous fluxes.

11. The surgical microscope according to claim 1, wherein the pupil splitting optical system is formed from a pair of triangular prisms.

12. The surgical microscope according to claim 1, wherein the splitting optical system comprises:

a splitting prism that is disposed on one of the optical paths of the second binocular luminous fluxes, and splits one of the second binocular luminous fluxes into a transmitted luminous flux and a reflected luminous flux; and a luminous flux guide optical system that guides either the transmitted luminous flux or the reflected luminous flux to the pupil splitting optical system and guides the other to the opening.

13. The surgical microscope according to claim 1, wherein the splitting optical system comprises:

a first splitting prism that is disposed on one of the optical paths of the first binocular luminous fluxes, and splits one of the first binocular luminous fluxes into a first transmitted luminous flux and a first reflected luminous flux; and a second splitting prism that is disposed on the optical path where the first transmitted luminous flux is incident, and splits this flux into a second transmitted luminous flux and a second reflected luminous flux, and the first reflected luminous flux is guided to the pupil splitting optical system, the second transmitted luminous flux forms one of the first binocular luminous fluxes, and the second reflected luminous flux forms one of the second binocular luminous fluxes.

14. The surgical microscope according to claim 1, wherein, when the second binocular luminous flux and the third binocular luminous flux exit through the opening in the first housing, the second binocular luminous flux and the third binocular luminous flux pass locations substantially equidistant from the rotational axis of the second housing, on the basis of the arrangement of the objective optical system, the splitting optical and the pupil splitting optical system.

* * * * *